(12) United States Patent
Nuttall et al.

(10) Patent No.: US 12,120,603 B2
(45) Date of Patent: *Oct. 15, 2024

(54) CONNECTING A WIRELESS DEVICE ACROSS MULTIPLE WIRELESS NETWORKS

(71) Applicant: Skylo Technologies, Inc., Palo Alto, CA (US)

(72) Inventors: Andrew Nuttall, Mountain View, CA (US); Meghna Agrawal, Cupertino, CA (US); Vijay Lewis, Wylie, TX (US)

(73) Assignee: Skylo Technologies, Inc., Palo Alto, CA (US)

(*) Notice: Subject to any disclaimer, the term of this patent is extended or adjusted under 35 U.S.C. 154(b) by 112 days.

This patent is subject to a terminal disclaimer.

(21) Appl. No.: 18/125,288

(22) Filed: Mar. 23, 2023

(65) Prior Publication Data

US 2023/0224808 A1 Jul. 13, 2023

Related U.S. Application Data

(63) Continuation of application No. 17/503,667, filed on Oct. 18, 2021, now Pat. No. 11,690,006.

(51) Int. Cl.
*H04W 48/18* (2009.01)
*H04W 40/02* (2009.01)
(Continued)

(52) U.S. Cl.
CPC .......... *H04W 48/18* (2013.01); *H04W 40/02* (2013.01); *H04W 40/06* (2013.01); *H04W 48/16* (2013.01); *H04W 88/16* (2013.01)

(58) Field of Classification Search
None
See application file for complete search history.

(56) References Cited

U.S. PATENT DOCUMENTS 6,473,413 B1 10/2002 Chiou et al.
7,167,705 B2 1/2007 Maes
(Continued)

FOREIGN PATENT DOCUMENTS

WO WO 2011/149532 12/2011

OTHER PUBLICATIONS

Notification of Transmittal of the International Search Report and the Written Opinion of the International Searching Authority, or the Declaration, International Application No. PCT/US 22/75494, Dated Dec. 6, 2022.

*Primary Examiner* — Kibrom T Hailu
*Assistant Examiner* — Berhanu D Belete
(74) *Attorney, Agent, or Firm* — Brian R Short (57) ABSTRACT

Apparatuses, methods, and systems for connecting a wireless device across multiple wireless networks are disclosed. One system includes a state machine and a router. The state machine operates to maintain a network availability of each of a plurality of wireless networks for a wireless device, wherein each of the plurality of wireless networks include network characteristics. The router operates to select a one of the plurality of wireless networks based on the network availability and the network characteristics as maintained by the state machine, process data packets according to the selected available wireless network based on the network characteristics of the selected available wireless network, and route the processed data packets to the wireless device through the selected one of the plurality of wireless networks.

18 Claims, 11 Drawing Sheets

(51) Int. Cl.
  *H04W 40/06*  (2009.01)
  *H04W 48/16*  (2009.01)
  *H04W 88/16*  (2009.01)

(56) References Cited

U.S. PATENT DOCUMENTS

| | | |
|---|---|---|
| 7,561,547 B2 | 7/2009 | Brideglall |
| 9,648,538 B2 | 5/2017 | Ganesan |
| 2002/0048277 A1 | 4/2002 | Bennett |
| 2003/0061298 A1* | 3/2003 | Berman ............... H04L 69/329 709/214 |
| 2005/0091357 A1* | 4/2005 | Krantz ................. H04W 48/18 709/223 |
| 2006/0039370 A1 | 2/2006 | Rosen et al. |
| 2006/0203804 A1* | 9/2006 | Whitmore ............... H04L 45/00 370/352 |
| 2008/0130637 A1 | 6/2008 | Kant et al. |
| 2009/0109868 A1* | 4/2009 | Chen ...................... H04L 41/34 370/254 |
| 2009/0316621 A1* | 12/2009 | Lane .................... H04B 7/2125 370/336 |
| 2010/0075704 A1 | 3/2010 | McHenry et al. |
| 2010/0128685 A1* | 5/2010 | Jiang ...................... H04W 8/12 455/433 |
| 2010/0322265 A1* | 12/2010 | Gopinath ............... H04L 49/901 370/417 |
| 2011/0261718 A1 | 10/2011 | Dahlstedt et al. |
| 2011/0282985 A1* | 11/2011 | Krantz .................. H04W 48/18 709/223 |
| 2012/0040666 A1 | 2/2012 | Buckley et al. |
| 2012/0127927 A1* | 5/2012 | Meirick ................ H04L 69/163 370/328 |
| 2012/0244859 A1* | 9/2012 | Jiang ...................... H04W 8/12 455/433 |
| 2014/0233374 A1 | 8/2014 | Elliot |
| 2015/0215832 A1 | 7/2015 | Fitzpatrick |
| 2015/0327147 A1* | 11/2015 | Ganesan ............... H04M 1/725 455/436 |
| 2016/0226136 A1* | 8/2016 | Paleta, Jr. ............. H01Q 19/13 |
| 2016/0315692 A1 | 10/2016 | Ahluwalia et al. |
| 2018/0092085 A1* | 3/2018 | Shaheen ........... H04W 36/0094 |
| 2018/0234970 A1 | 8/2018 | Hail et al. |
| 2019/0171187 A1* | 6/2019 | Cella ....................... G06N 3/126 |
| 2019/0220626 A1* | 7/2019 | LeMasters ............ G06F 21/572 |
| 2019/0268890 A1* | 8/2019 | Schellmann .......... H04L 5/0041 |
| 2020/0145345 A1 | 5/2020 | Finkelstein |
| 2020/0213318 A1 | 7/2020 | Ojha et al. |
| 2021/0058149 A1 | 2/2021 | Nuttall et al. |
| 2022/0148038 A1* | 5/2022 | Cohn ................. G06Q 30/0251 |

\* cited by examiner

Maintaining, by a state machine, a network availability of each of a plurality of wireless networks for a hub, wherein each of the plurality of wireless networks include network characteristics, wherein the network characteristics include at least IP and non-IP protocols, satellite and non-satellite communication channels, and a connection status
910

Selecting, by a router, a one of the plurality of wireless networks based on the network availability and the network characteristics as maintained by the state machine
920

Processing, by the router, data packets according to the selected available wireless network based on the network characteristics of the selected available wireless network
930

Routing, by the router, the processed data packets to the hub through the selected one of the plurality of wireless networks
940

Network Characteristics of State Machine

| HUB ID | Connected Node | Protocol | Error Handling Routine | Timeout |
|---|---|---|---|---|
| 000001 | MME-1243 | NIDD | Sub-Routine A | 10 s |
| .... | | | | |
| 999999 | 192.168.0.1 | IP-LPWAN | Sub-Routine B | 1 s |

Figure 11

CONNECTING A WIRELESS DEVICE ACROSS MULTIPLE WIRELESS NETWORKS

RELATED APPLICATIONS

This patent application is a continuation of U.S. patent application Ser. No. 17/503,667, filed Oct. 18, 2021, which is herein incorporated by reference.

FIELD OF THE DESCRIBED EMBODIMENTS

The described embodiments relate generally to wireless communications. More particularly, the described embodiments relate to systems, methods, and apparatuses for connecting a wireless device across multiple wireless networks.

BACKGROUND

Current data networks are designed primarily for human users and the network and traffic characteristics that human users generate. The growth and proliferation of low-cost embedded wireless sensors and devices pose a new challenge of high volumes of low bandwidth devices vying for access to limited network resources. One of the primary challenges with these new traffic characteristics is the efficiency at which the shared network resources can be used. For common low bandwidth applications such a GPS tracking, the efficiency (useful/useless data ratio) can often be below 10%. This inefficiency is the result of large volumes of devices communicating in an uncoordinated environment. Addressing this problem is fundamental to the future commercial viability of large-scale sensor network deployments.

It is desirable to have methods, apparatuses, and systems for connecting a wireless device across multiple wireless networks.

SUMMARY

An embodiment includes a wireless communication system. The wireless communication system includes a state machine and a router. The state machine operates to maintain a network availability of each of a plurality of wireless networks for a wireless device, wherein each of the plurality of wireless networks include network characteristics include at least a connection status. The router operates to select a one of the plurality of wireless networks based on the network availability and the network characteristics as maintained by the state machine, process data packets according to the selected available wireless network based on the network characteristics of the selected available wireless network, and route the processed data packets to the wireless device through the selected one of the plurality of wireless networks.

Another embodiment includes a method. The method includes maintaining, by a state machine, a network availability of each of a plurality of wireless networks for a wireless device, wherein each of the plurality of wireless networks include network characteristics, wherein the network characteristics include a connection status, selecting, by a router, a one of the plurality of wireless networks based on the network availability and the network characteristics as maintained by the state machine, processing, by the router, data packets according to the selected available wireless network based on the network characteristics of the selected available wireless network, and routing, by the router, the processed data packets to the wireless device through the selected one of the plurality of wireless networks.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for connecting a wireless hub across multiple wireless networks. For an embodiment, the wireless hub is an aggregation device for desperate sensors or actuator devices. That is, the wireless hub facilitates wireless communication between an upstream network and the desperate sensors or actuator devices. For an embodiment, the wireless hub includes a stand-alone sensor or device such as a wireless phone or temperature sensor with a communication module. For embodiments, the term hub is synonymous with sensor, device, and any systems with a communication module.

Figure 1:
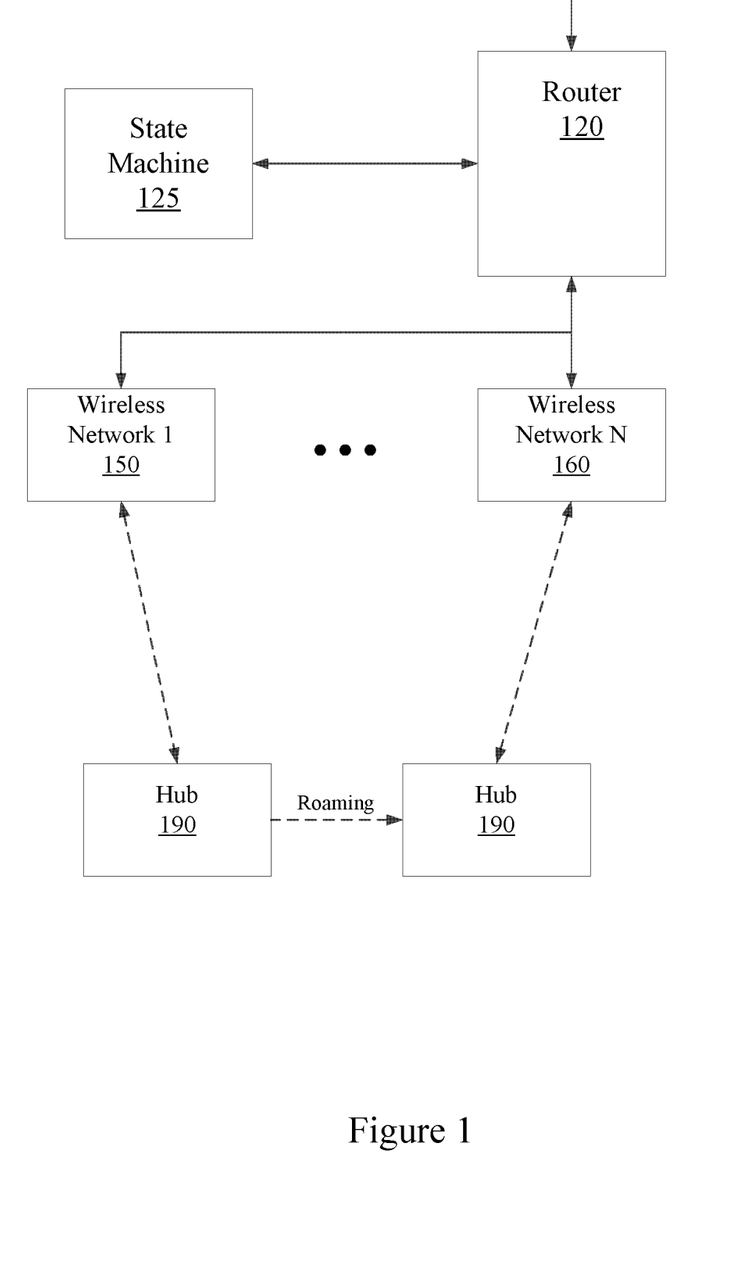
FIG. 1 shows a wireless communication system for connecting a wireless hub across multiple wireless networks, according to an embodiment.

FIG. 1 shows a wireless communication system for connecting a wireless hub 190 across multiple wireless networks 150, 160, according to an embodiment. For an embodiment, the wireless communication system includes a state machine 125 and a router 120. While shown separately, it is to be understood that the state machine 125 could be included within the router 120.

For an embodiment, the state machine operates (configured to) to maintain a network availability of each of the plurality of wireless networks 150, 160 for the hub 190. For an embodiment, each of the plurality of wireless networks 150, 160 include network characteristics. For an embodiment, the network characteristics include at least IP and non-IP protocols, satellite and non-satellite communication channels, and a connection status. For at least some embodiments, the network characteristics include at least MVNO (mobile virtual network operator) roaming capabilities, data billing rates, supported network features, network protocol, and network physical layer performance characteristics.

For an embodiment, the router 120 operates (configured to) to select a one of the plurality of wireless networks 150, 160 based on the network availability and the network characteristics as maintained by the state machine 125, process data packets according to the selected available wireless network based on the network characteristics of the selected available wireless network, and route the processed data packets to the hub 190 through the selected one of the plurality of wireless networks 150, 160.

For an embodiment, the router 120 operates to route the processed data packets to the selected one of the plurality of wireless networks 150, 160 as determined by the state machine 125 when the hub 190 roams from one wireless network to another wireless network.

For at least some embodiments, a downstream (network to hub) or forward direction routing of packets from the router 120 to the hub 190 has different operations than upstream or return direction of routing of packets from the hub 190 to the router 120. For an embodiment, every instance of the downstream or forward direction of routing a packet includes the router 120 selecting a one of the plurality of wireless networks 150, 160 for routing the packet to the hub 190. However, as will be described, the hub 190 receives (on occasion, that is, not continuously) a network selection rulebook (shown in FIG. 2) for the upstream (hub to network) or return direction of the routing of packets from the hub 190 to the router 120. For an embodiment, for every instance of the routing of a packet in the upstream or return direction, the hub 190 selects a one of the plurality of wireless networks 150, 160 based upon the previously shared network selection rulebook. For an embodiment, hub 190 selection of the one of the plurality of wireless networks 150, 160 can additionally be based on a local state of the hub 190. For an embodiment, downstream (forward) data traffic can be through one wireless network and upstream (return) data traffic is through another wireless network.

As described, for at least some embodiments, the router 120 selects a one of the plurality of wireless networks 150, 160 based upon network characteristics of each of the plurality of wireless networks 150, 160, wherein the characteristics include at least IP and Non-IP protocols, and satellite and non-satellite communication channels, MVNO (mobile virtual network operator) roaming capabilities, data billing rates, supported network features, network protocol, and network physical layer performance characteristics. Further, the router 120 processes data packets according to the selected available wireless network based on the network characteristics.

For at least some embodiments, the hub 190 operates to maintain multiple connections to a platform server (located upstream from the router 120) through multiple of the plurality of available networks 150, 160, and wirelessly communicates with at least one of the plurality of available networks 150, 160 in accordance with the network selection rulebook. For an embodiment, the hub 190 may communicate with the router 120 through multiple different networks simultaneously. For example, one type of data may be routed through one of the wireless networks 150, 160 and a different type of data may be routed through another one of the wireless networks 150, 160. For at least some embodiments, the hub 190 operates to maintain multiple connections to multiple platform servers, wherein the connections to the platform servers are based upon the network characteristics and the type of data transmitted. For an embodiment, the hub 190 may maintain a connection to a first platform server when transmitting data over a network with characteristic of the IP-based protocol and maintain a connection to a second platform server when transmitting data over a network with characteristics of the non-IP-based protocol.

For an embodiment, the hub 190 may have multiple active wireless network connections to the platform server through the router 120, and data is sent over these different networks based upon the type of data. For example, broadcast firmware updates may be wirelessly communicated over a satellite wireless network, and text messages may be wirelessly communicated over a cellular wireless network. For an embodiment, the hub 190 may maintain multiple connections to the router 120 through multiple wireless networks, and then send data across the multiple connections in accordance with the network selection rulebook. For an embodiment, data may also be sent over different available networks based upon the data consumption for the hub 190 on each network and associated data communication tariffs. For an embodiment, the selection may also be based upon the currently active eSIM/SIM (subscriber identity module) profile.

At least some embodiments include updating the state machine 125 through messages received from the hub 190 or received from the network elements. For an embodiment, the network elements include one or more of base stations, core networks, mobility management elements (MME), Service capabilities exposure functions (SCEF), serving gateways (SGW), or the infrastructure over which the data from the hub passes.

For an embodiment, the hub 190 operates to periodically transmit IP (internet protocol) packets to the router 120 based on the connected network and network characteristics, including the hub 190 periodically transmitting the IP packets to the router 120 or the state machine 125 to keep IP sessions alive between the hub 190 and router 120, and the router 120 uses the periodic IP packets to ensure that network availability information is current and the network characteristics in the state machine 125 (for example, IP address) are accurate. For an embodiment, the IP packets are not transmitted periodically, but rather, can be transmitted based upon the last time a packet is transmitted or received with the network and the network characteristics available in the network selection rulebook. For an embodiment, the network selection rulebook can define the frequency of periodic packets or a minimum time between two consecutive communications of IP packets required to keep connection alive. For at least some embodiments, periodic IP packets can further include information related to network availability and performance (for example, SINR, congestion related metrics), which can be decoded by router or the state machine to update the network characteristics and network selection rulebook.

For at least some embodiments, the plurality of wireless networks 150, 160 includes at least a cellular mobility management entity or a satellite mobility management entity. Further, for at least some embodiments, the state machine 125 includes a database that includes a list of available connection paths to the hub 190. This information includes things like type of connectivity (IP versus NIDD), protocol (SSMP (proprietary protocol) versus COAP (Constrained Application Protocol)), expected latency (5 s satellite vs 100 ms cellular (non-satellite). For an embodiment, the available networks in the state machine 125 are updated through signaling by the hub through the router 120. For an embodiment, the state machine 125 includes a total list of possible wireless networks not just only active wireless networks.

Figure 2:
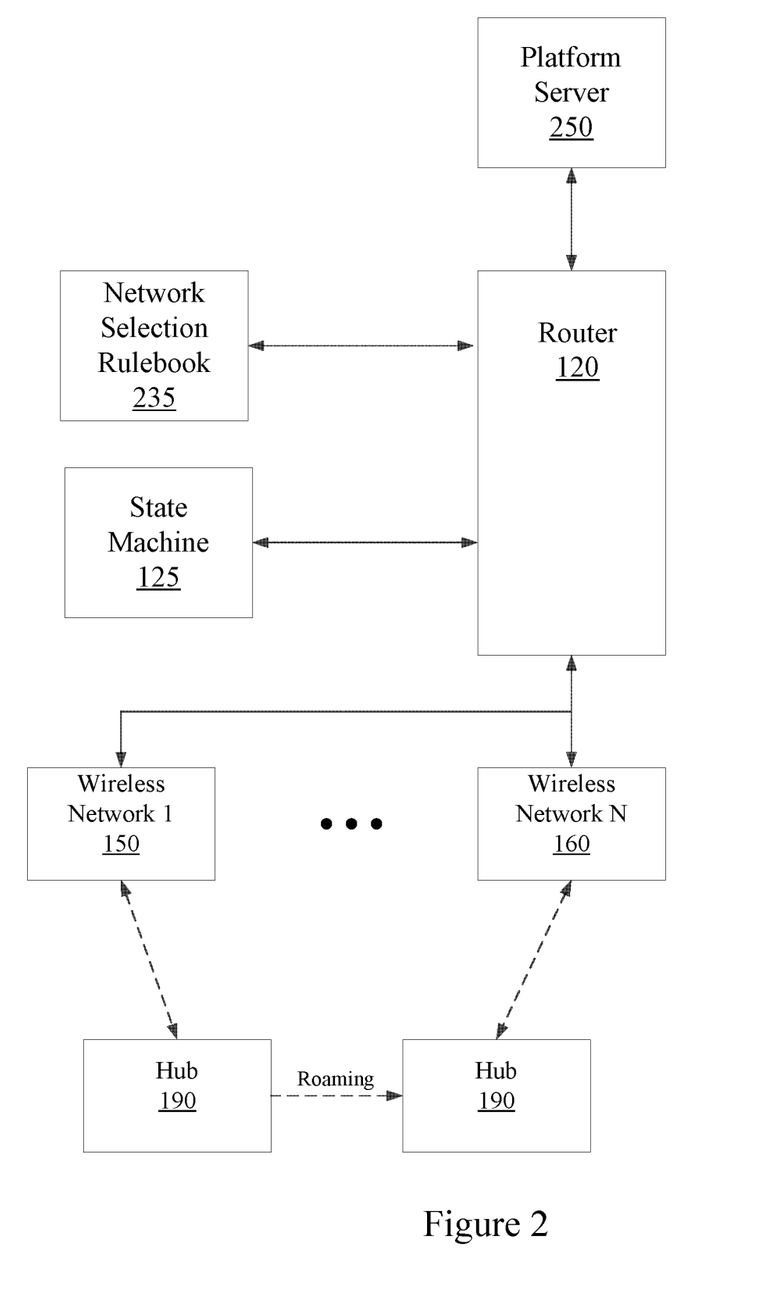
FIG. 2 shows a wireless communication system for connecting a wireless hub across multiple wireless networks that include a network selection rule book, according to an embodiment.

FIG. 2 shows a wireless communication system for connecting a wireless hub 190 across multiple wireless networks 150, 160 that include a network selection rule book 235, according to an embodiment. For at least some embodiments, the hub 190 is operative to receive the network selection rulebook 235, wherein the network selection rulebook 235 provides data packet processing and available network routing rules. For an embodiment, the network selection rulebook 235 is generated based upon the network availability and network characteristics. For an embodiment, network selection rulebook is generated by the router 120, or by a separate system server, such as, a platform server 250. For an embodiment, the network selection rulebook indicates under which conditions different eSIM/SIM profiles are activated and what networks are utilized for traffic throughput.

For at least some embodiments, the hub 190 synchronizes with the state machine through the network selection rulebook, wherein the hub actively acknowledges updates to its network selection rulebook to the router, and wherein the rulebook is not updated without positive acknowledgement from both the state machine and the hub. For at least some embodiments if a positive acknowledgment from both the state machine and the hub is not available then the state machine and the hub assume a default network selection rulebook.

For at least some embodiments, the hub 190 operates to select a one of the plurality of wireless networks to transmit data packets to the router 120 based on the network selection rulebook and additionally based on a local operating state of the hub 190, where the local operating state of the hub 190 includes a set of local conditions of the hub 190. For an embodiment, the set of location conditions of the hub 190 includes one or more of an SINR of signals received by the hub 190, reference signal received power (RSRP), received signal strength indicator (RSSI), channel congestion, cell-ID, channel, frequency band, home subscriber system (HSS) registration for eSIM/SIM, security requirements of the data packet, the wireless networks available to the hub 190, application data of the hub 190, and/or data consumption of the hub 190. For an embodiment, one or more of the local inputs are provided to a rule engine (that follows the network selection rulebook) that produces an action, such as, selecting which wireless network the hub 190 is to send what data over.

For at least some embodiments, the hub 190 operates to provide an update to the router 120 and state machine 125 of network availability and connection status. For an embodiment, the network availability indicates which of the plurality of wireless networks 150, 160 are available to the hub for connection. For an embodiment, a connection status of the hub 190 indicates which of the wireless networks 150, 160 the hub is presently connected. For an embodiment, the network availability of the hub 190 and the connection status of the hub 190 are used as input for adaptively updating the network selection rulebook of each of the hub 190 and other hubs. For an embodiment, the platform server 250 performs the adaptive updating of the network selection rulebooks of multiple hubs.

For an embodiment, the hub 190 receives broadcast network availability packets (for example, sync signals, System Information Blocks, Master Information Blocks, etc.) from available wireless networks. When hub 190 moves (roams) from one wireless network to another wireless network (for example, when the hub 190 moves from a satellite wireless network to terrestrial wireless network), the hub 190 can explicitly update the router 120 and the state machine 125 about the connection status of the hub 190. For an embodiment, after receiving the update, the state machine 125 identifies the terrestrial wireless network as the active wireless network, and future communication happens through the terrestrial wireless network. For an embodiment, the router can also retransmit previous packets (transmitted over the prior active wireless network) for which an acknowledgement of the previous packets has not yet been received. For at least some embodiments, along with the connectivity status update, hub 190 can also send information about last message received by hub 190 that was not acknowledged previously, which can be used by router 120 to retransmit previously transmitted packet.

For an embodiment, the platform server 250 pushes updates to the network selection rulebook based on at least a use case, geography, or network traffic. For example, the user of the hub 190 may decide to opt into a weather alert service. For an embodiment, the network selection rulebook of the hub or hubs of the user receive updates for weather alerts over a satellite wireless network, while other data traffic as specified by the network selection rulebook uses a cellular wireless network. As an example of the geography use case, when a hub or hubs of the use enters region where certain network transmissions are banned, the platform server may push an update that restrict wireless communication by the hub(s). As an example of the network traffic case, for an embodiment, the platform server 250 may observe that the hub(s) of the user has exceeded a data consumption quota on a cellular wireless network, therefore all traffic regardless of priority is pushed over a satellite wireless network.

Figure 3:
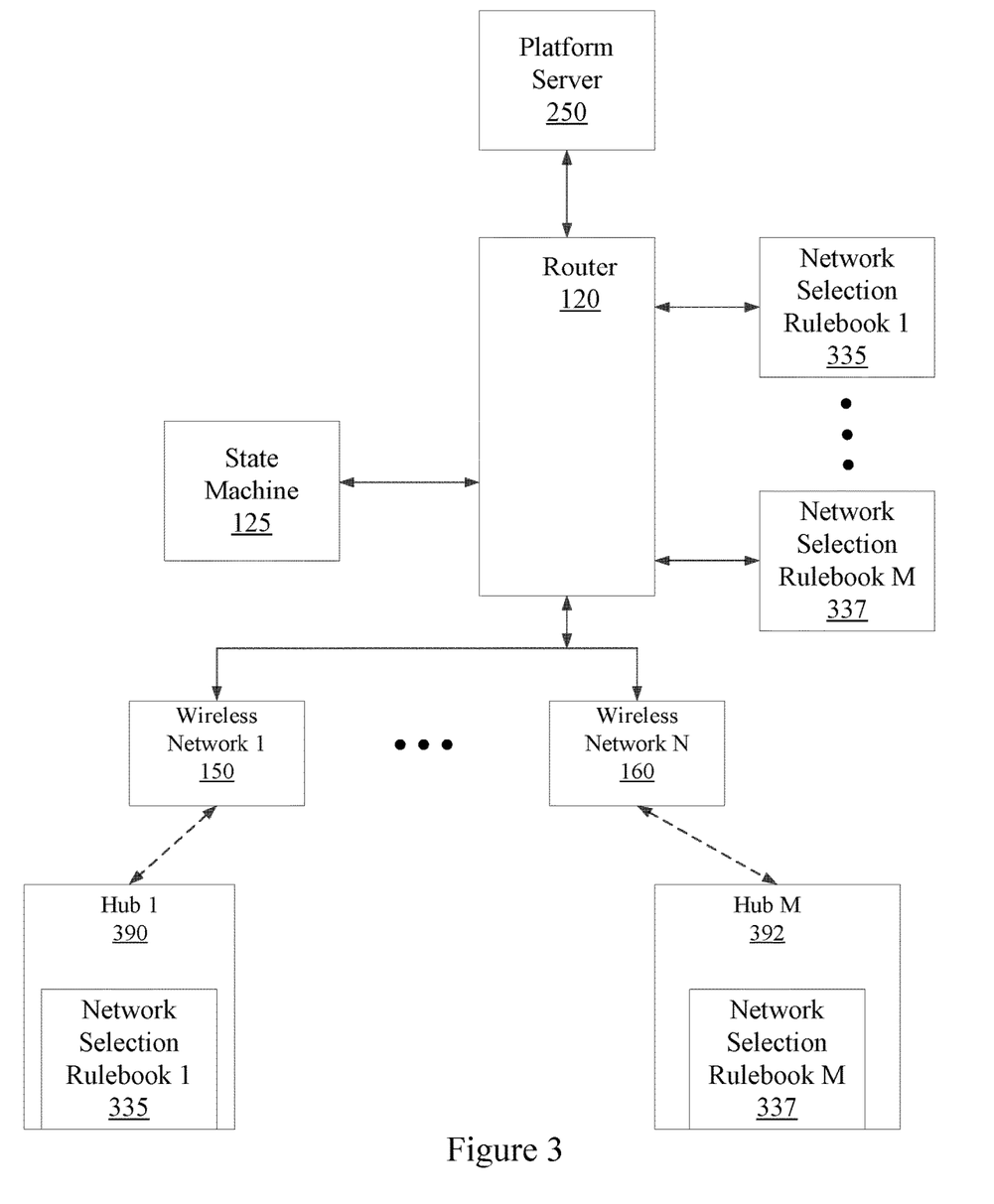
FIG. 3 shows a wireless communication system for connecting multiple wireless hubs across multiple wireless networks that includes a network selection rule book for each of the wireless hubs, according to an embodiment.

FIG. 3 shows a wireless communication system for connecting multiple wireless hubs 390, 392 across multiple wireless networks 150, 160 that includes a network selection rule book 335, 337 for each of the wireless hubs 390, 392, according to an embodiment. That is, for an embodiment, a unique network selection rulebook is generated for each of the plurality of hubs.

For at least some embodiments, each hub 390, 392 operate by a set of rules defined by the network selection rulebooks 335, 337. For an embodiment, the network selection rulebooks 335, 337 are distributed to hubs 390, 392 by the platform server 250. It is not a requirement that every hub 390, 392 have the same set of rules, but it is required that the network selection rulebook of every hub 390, 392 is coordinated and in synchronized with the platform server 250. For an embodiment, the platform server 250 can additionally adaptively change the network selection rulebooks assigned to of the hubs 390, 392 based upon (network traffic, use cases, reported local conditions of hubs, etc.) and send the network selection rulebooks back to a hub 390, 392. For an embodiment, the hubs 390, 392 may adaptively change their behavior based upon local sensed variables, but actions of the hubs 390, 392 must all fit within the confines of their currently assigned ruleset of their network selection rulebook.

Figure 4:
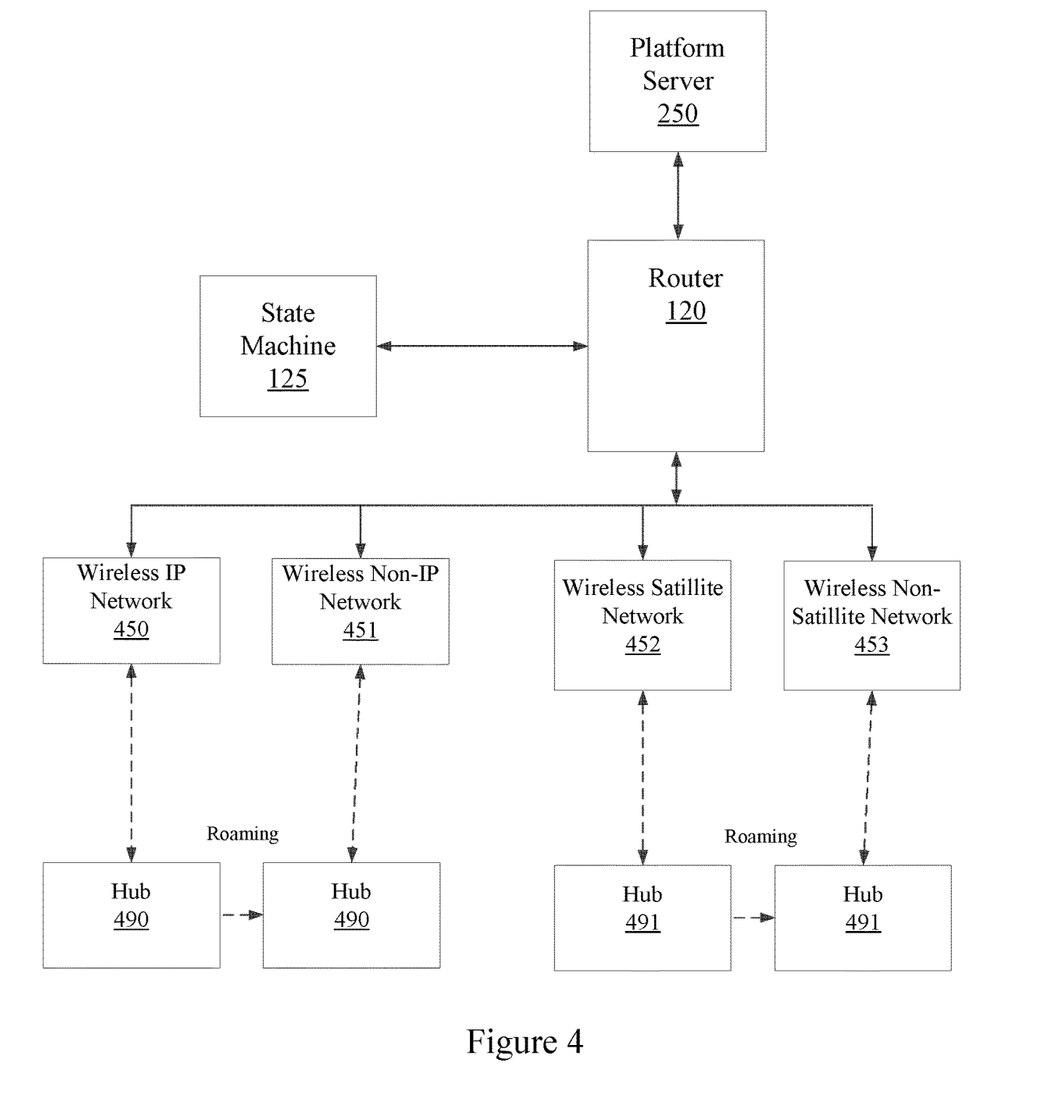
FIG. 4 shows a wireless communication system for connecting wireless hubs across multiple wireless networks including IP and non-IP networks, and satellite and non-satellite networks, according to an embodiment.

FIG. 4 shows a wireless communication system for connecting wireless hubs 490, 491 across multiple wireless networks 450, 451, 452, 453 including IP and non-IP networks 450, 451, and satellite and non-satellite networks 452, 453, according to an embodiment. For an embodiment, the satellite and non-satellite network characteristics include at least a communication latency. As previously described, for an embodiment, the state machine 125 operates to maintain a network availability of each of a plurality of wireless networks for the hubs. As previously described, for an embodiment, the router 120 operates to route the processed data packets to the selected one of the plurality of wireless networks 150, 160 as determined by the state machine 125 when the hubs 490, 491 roam from one wireless network to another wireless network. The communication latency of the wireless networks is used by the router 120 and the state machine 125 to determine the routing. Other satellite and non-satellite network characteristics include one or more of time out periods, retry mechanisms, encoding schemes, data transmission methods, and acknowledgement mechanisms. For an embodiment, the satellite and non-satellite network characteristics include the communication latency, and wherein the router updates its communication timeout mechanism based upon the communication latency of the selected network.

For an embodiment, the IP and non-IP network characteristics include at least a protocol. For at least some embodiments, the IP and non-IP network characteristics further include one or more of a data packet header packaging, a retry mechanisms, a routing mechanism, an application protocol, and/or an acknowledgement mechanisms. For an embodiment, the IP and non-IP network characteristics include a communication protocol, and further, the retry and acknowledgment mechanism of the router is updated based upon the communication protocol.

Figure 5:
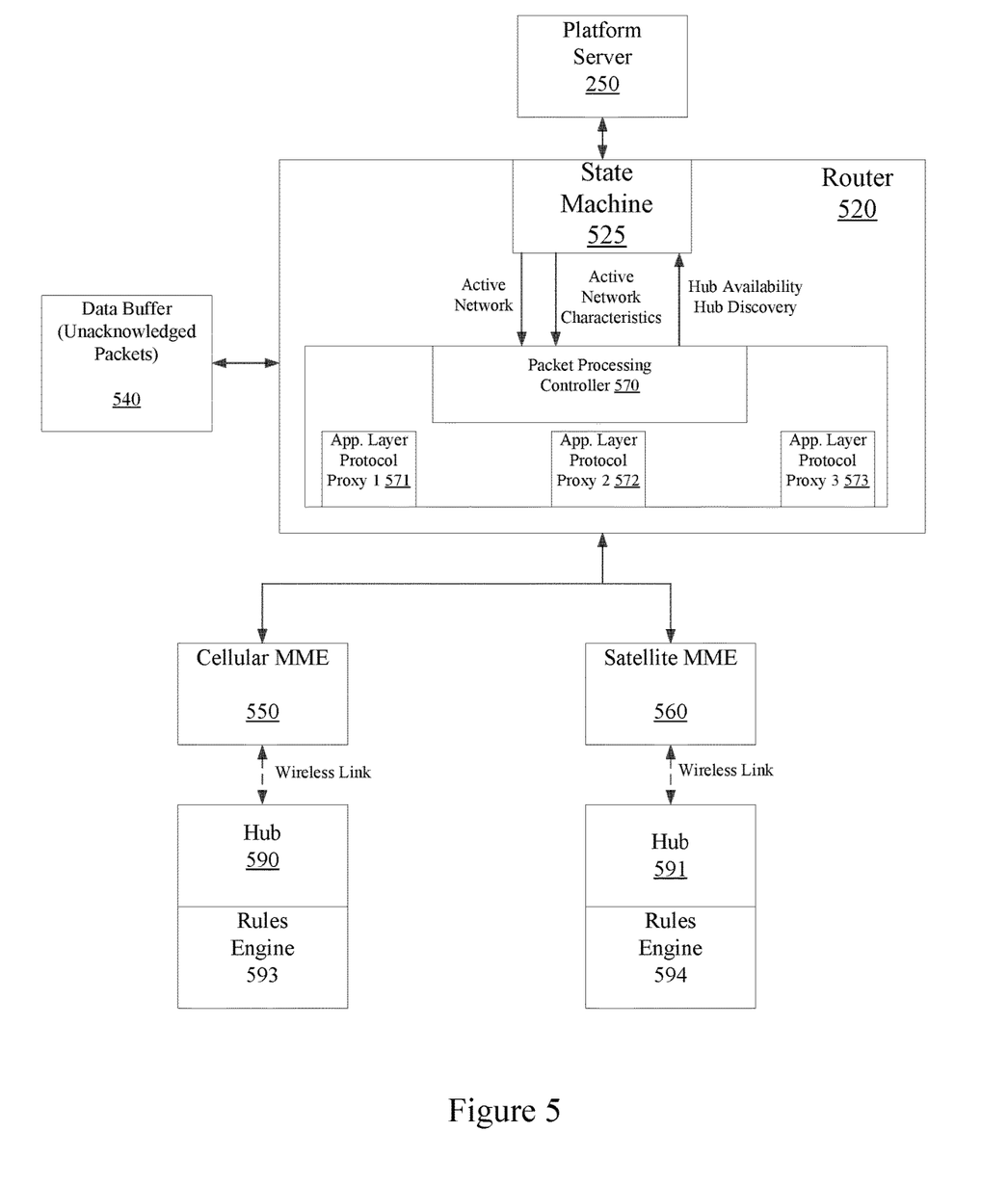
FIG. 5 shows data packet processing of a wireless communication system for connecting a wireless hub across multiple wireless networks, according to an embodiment.

FIG. 5 shows data packet processing of a wireless communication system for connecting a wireless hub across multiple wireless networks, according to an embodiment. As shown, for an embodiment, the router 520 includes the state machine 525. As previously described, the hubs 590, 591 operative to receive (through the wireless networks 550, 560 a network selection rulebook (provided to rule engines 593, 594 of the hubs 590, 591), wherein the network selection rulebook provides data packet processing and available network routing rules, wherein the network selection rulebook is generated based upon the network availability and network characteristics. As previously described, for an embodiment, packets communicated from the router 520 to the hubs 590, 591 that have not yet been acknowledged, remain in the data buffer 540.

For an embodiment, the router 520 includes a packet processing controller 570, and application layer protocol proxies 571, 572, 573. As previously described, the packet processing includes both controls over the data packets, and control of packaging of the data packets.

For an embodiment, processing the data packets includes packet packaging, protocol adaptation, and packet acknowledgement and a retry mechanism based upon the network characteristics of the selected network. For an embodiment, packet packaging includes adding a header that allows a different type of network to appropriately route and receive a packet.

For an embodiment, protocol adaptation of the application layer protocol proxies 571, 572, 573 includes packet formatting, addition of additional information, such as, maintaining packet sequence number, enforcing strict FIFO or not packet ordering, or auto generation of control message. For an embodiment, processing performed by the router 520 acts to transmit data across networks 550, 560 with different characteristics by performing packet packaging, error handling, and acknowledgement and retry mechanisms based upon the characteristics of the selected network.

For an embodiment, the router 520 operates to receive packets to transmit to hubs 550, 560 from the buffer 540. The router 520 further operates to obtain preferred network and the network characteristics for the data transmission from the state machine 525.

The router 520 further operates to set timeout and retry mechanism according to the selected network. For an embodiment, the timeout and retry mechanisms depend upon the priority of the packet in the data buffer 540 as well as network characteristics. For example, the packet transmission timeout may be different for satellite network and terrestrial network.

The router 520 further operates to provide the packet along with state machine parameters to the application layer protocol proxies 571, 572, 573 (the application layer protocol is part of the network characteristics and is provided by state machine).

For an embodiment, the application layer proxy (of the application layer protocol proxies 571, 572, 573) encapsulates the packet as per the protocol and sends the packet to a network interface. For an embodiment, the application layer proxy manages the communication with the underlying network interface. The application layer proxy provides the Ack/Nack/timeout msg to a buffer 540 manager (not shown). For an embodiment, the buffer manager keeps the packet in the buffer 540 if the packet is not transmitted successfully and retransmits the packet when hub is available.

For an embodiment, there are one or multiple adapters for each network interface. Network adapters maintain communication with the network interface, which includes encapsulation of the packet.

Figure 6A:
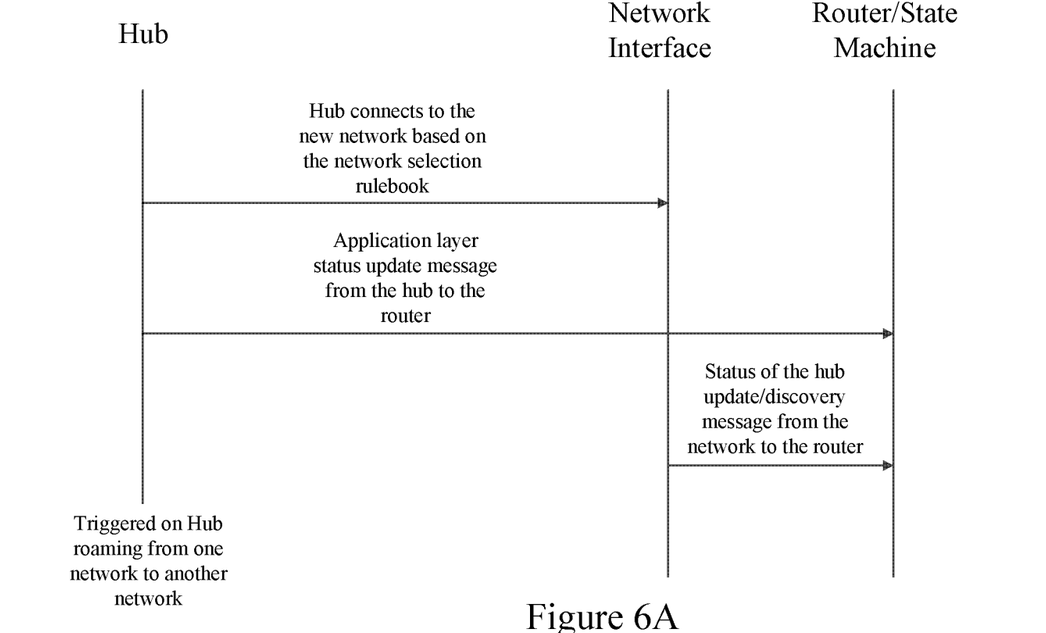
FIGS. 6A and 6B show timing diagrams of status updates from a hub to a router, according to embodiments.
Figure 6B:
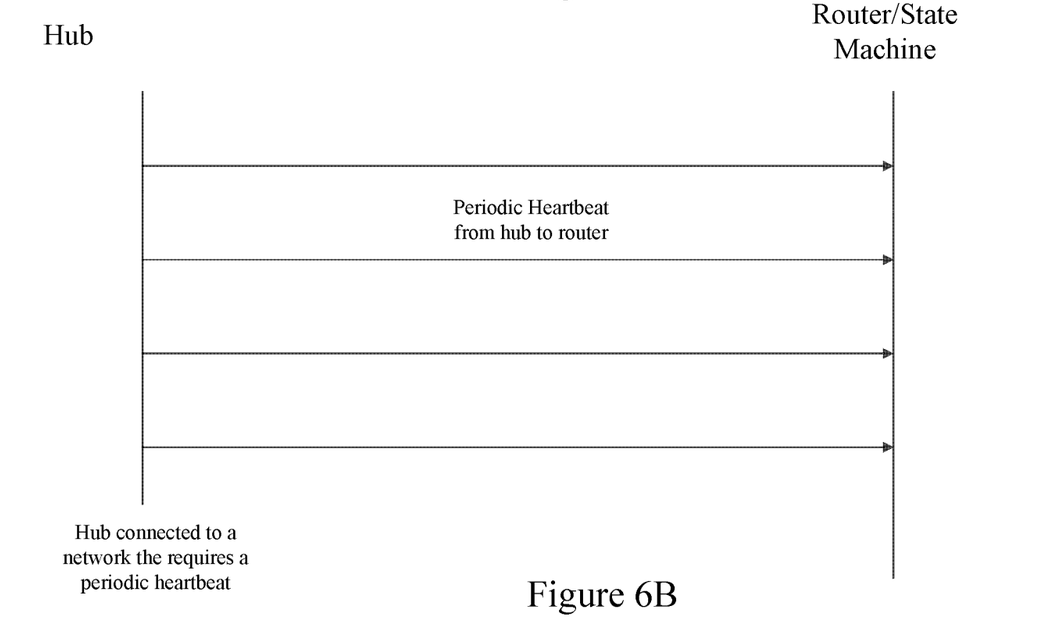

FIGS. 6A and 6B show timing diagrams of status updates from a hub to a router, according to embodiments. As shown, when a hub roams from one network to another (new) network, the selection of the new network is based on the network selection rulebook. The hub then provides an application layer status update message to the router. Further, a network interface of the new network provides a status of the hub to the router. The status update message from the hub to the router and the status provided by the network interface to the router can both occur, or each can occur independently.

As shown in FIG. 6B, when the hub is connected to a network the requires a periodic heartbeat, the hub periodically transmits the IP packets to the router or the state machine to keep IP sessions alive between the hub and router, and the router uses the periodic IP packets to ensure that network availability information is current and the network characteristics in the state machine (for example, IP address) are accurate.

As previously described, for an embodiment, the IP packets are not transmitted periodically, but rather, can be transmitted based upon the last time a packet is transmitted or received with the network and the network characteristics available in the network selection rulebook. For an embodiment, the network selection rulebook can define the frequency of periodic packets or a minimum time between two consecutive communications of IP packets required to keep connection alive. For at least some embodiments, periodic IP packets can further include information related to network availability and performance (for example, SINR, congestion related metrics), which can be decoded by router or the state machine to update the network characteristics and network selection rulebook.

Figure 7:
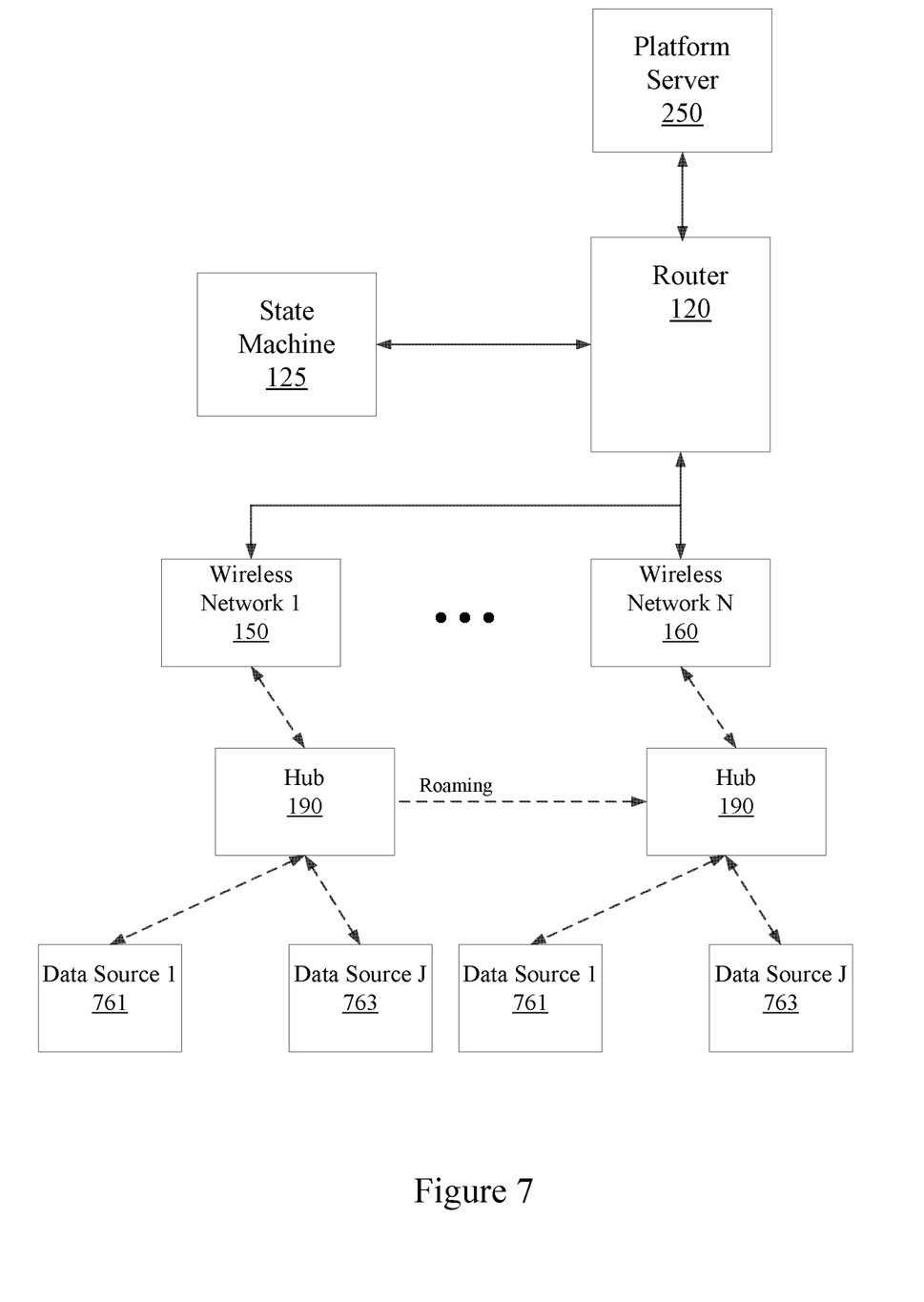
FIG. 7 shows a wireless communication system for connecting a wireless hub across multiple wireless networks, wherein the wireless hub is connected to multiple data sources, according to an embodiment.

FIG. 7 shows a wireless communication system for connecting a wireless hub 190 across multiple wireless networks 150, 160, wherein the wireless hub 190 is connected to multiple data sources 761, 763, according to an embodiment. For an embodiment, the state machine 125 additionally operates to maintain statuses of connection types of data sources 761, 763 connected to the hub 190. Further, for an embodiment, processing of the data packets is further based on the statuses of connection type of the data sources 761, 763. For an embodiment, the state machine 125 tracks nested (meaning multiple network connections layers and packaging are linked together) network connections and associated network characteristics. For example, the platform server 250 may want to send a data packet to an actuator (one of the data sources) in the field. The system platform 250 can identify from the state machine that the actuator is connected to hub X over BLE with network characteristics Y (nested connection). The system platform 250 may then identify that the hub X is connected over network Z with characteristics A. The system platform 250 and the router 120 then packages and routes data packets accordingly.

For an embodiment, the state machine 125 additionally operates to maintain statuses of connection types of data sources 761, 763 connected to the hub 190. Further, for an embodiment, the selection of the one of the plurality of wireless networks 150, 160 is additionally based on the statuses of connection type of the data sources 761, 763. For example, the hub 190 may have two wireless network types available, a NIDI) satellite wireless network and an IP terrestrial (non-satellite) wireless network. For cost (or other reasons) the default preference is NIDD satellite, but for a specific application (for example, banking) to enable the application's security requirements a direct IP connection between the bank and the nested device is required, thus the default choice is not chosen, Additionally, the default preferences can be chosen because of the available network types of the end device (data source 761, 763). For example, if the end device (data source 761, 763) only supports IP, then the huh 190 must also connect over IP.

Figure 8:
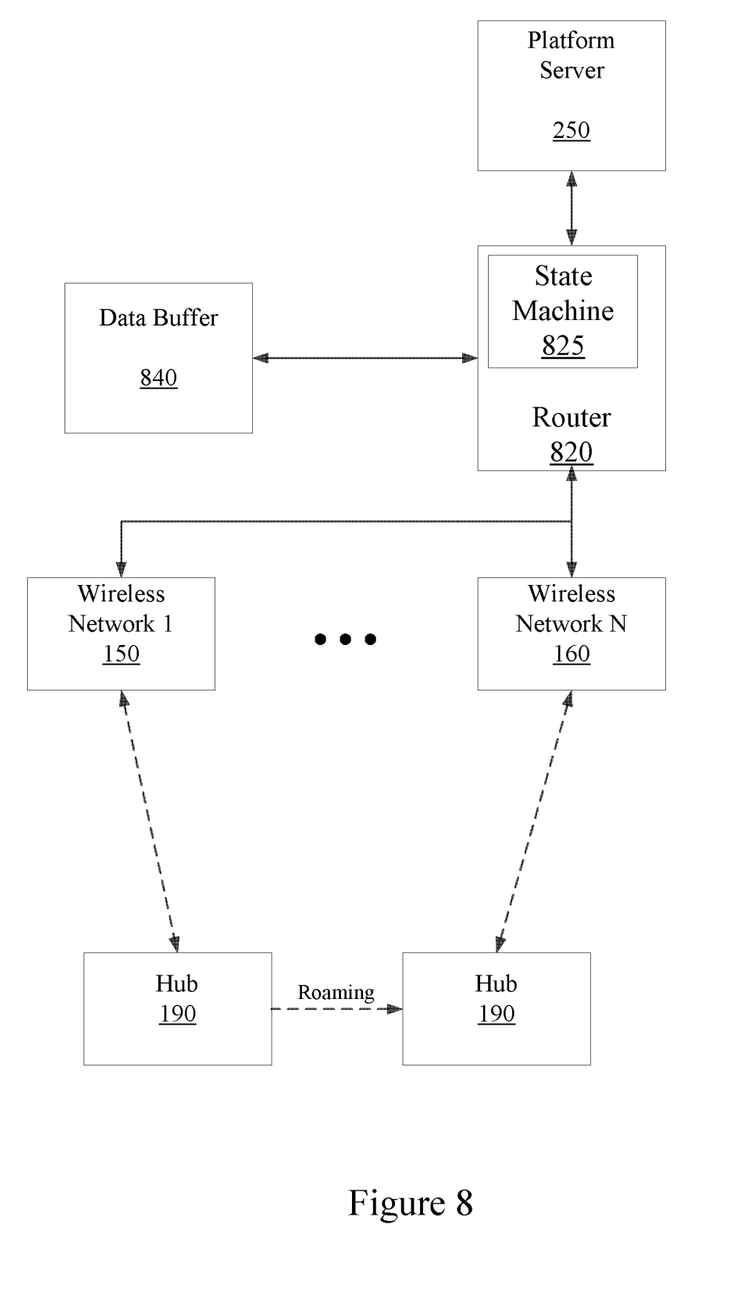
FIG. 8 shows a wireless communication system for connecting a wireless hub across multiple wireless networks that additionally includes a data buffer, according to an embodiment.

FIG. 8 shows a wireless communication system for connecting a wireless hub 190 across multiple wireless networks 150, 160 that additionally includes a data buffer 840, according to an embodiment. For at least some embodiments, the data buffer is operative to queue pre-processed data packets, wherein each data packet of the data buffer remains in the data buffer until the router successfully transmits the packet based upon the network characteristics of the selected network. For an embodiment, a successful transmission of the packet is identified by the reception of an acknowledgement of successful reception of the data packet.

For an embodiment, upon an update to the state machine, the data router retrieves previously unsuccessfully transmitted data packets from the data buffer and reprocesses the retrieved unsuccessfully transmitted data packets based upon the network characteristics of the newly selected network.

Figure 9:
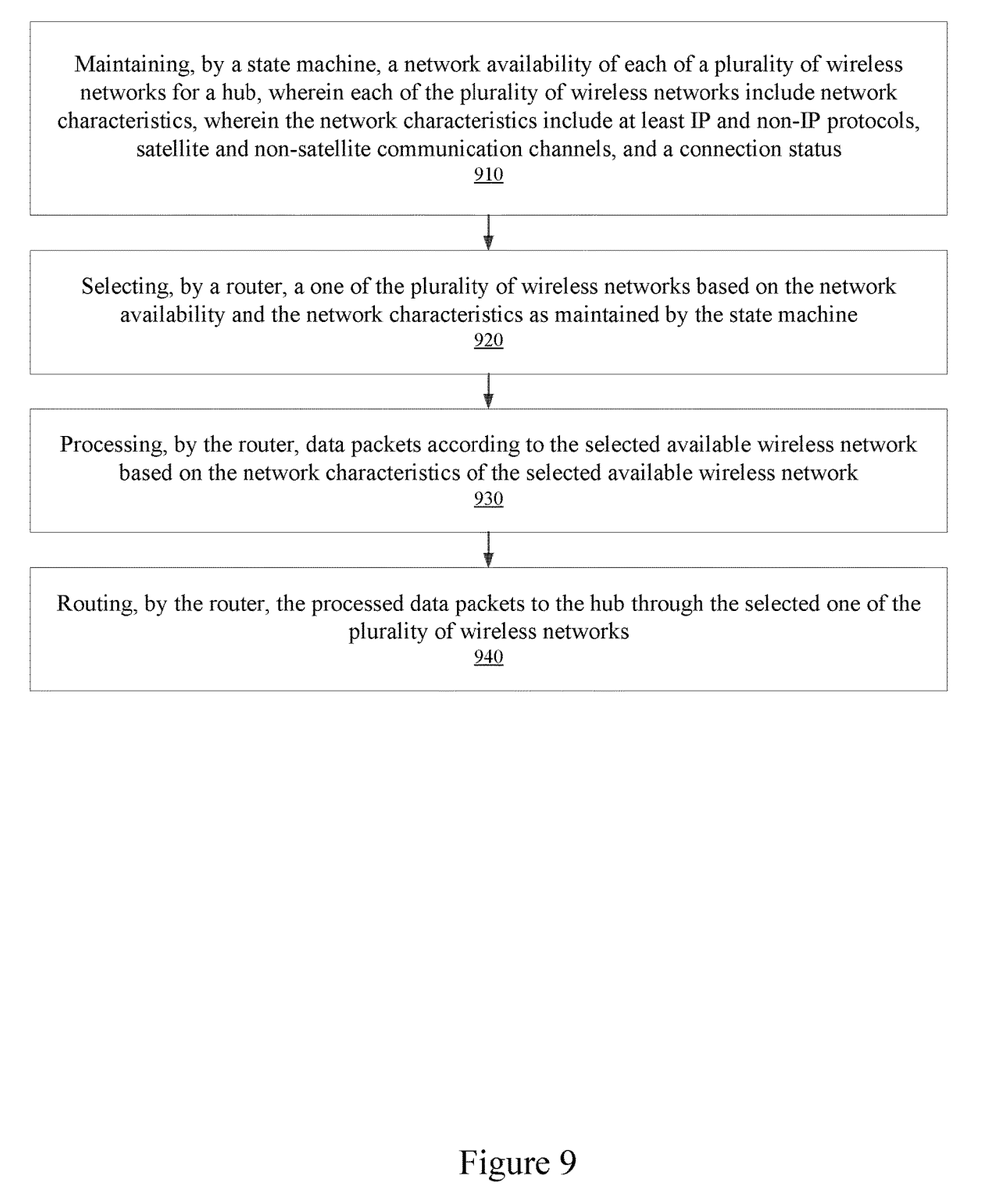
FIG. 9 is a flow chart of steps of a method for connecting a wireless hub across multiple wireless networks, according to an embodiment.

FIG. 9 is a flow chart of steps of a method for connecting a wireless hub across multiple wireless networks, according to an embodiment. A first step 910 includes maintaining, by a state machine, a network availability of each of a plurality of wireless networks for a hub, wherein each of the plurality of wireless networks include network characteristics, wherein the network characteristics include at least IP and non-IP protocols, satellite and non-satellite communication channels, and a connection status. A second step 920 includes selecting, by a router, one of the plurality of wireless networks based on the network availability and the network characteristics as maintained by the state machine. A third step 930 includes processing, by the router, data packets according to the selected available wireless network based on the network characteristics of the selected available wireless network. A fourth step 940 includes routing, by the router, the processed data packets to the hub through the selected one of the plurality of wireless networks.

As previously described, an embodiment further includes receiving, by the hub, a network selection rulebook, wherein the network selection rulebook provides data packet processing and available network routing rules, wherein the network selection rulebook is generated based upon the network availability and network characteristics, and selecting, by the hub, a one of the plurality of wireless networks to transmit data packets to the router based on the network selection rulebook and additionally based on a local operating state of the hub, where the local operating state of the hub includes a set of local conditions of the hub.

As previously described, an embodiment further includes maintaining, by the state machine, statuses of connection types of data sources connected to the hub, and wherein processing of the data packets is further based on the statuses of connection type of the data sources.

Figure 10:
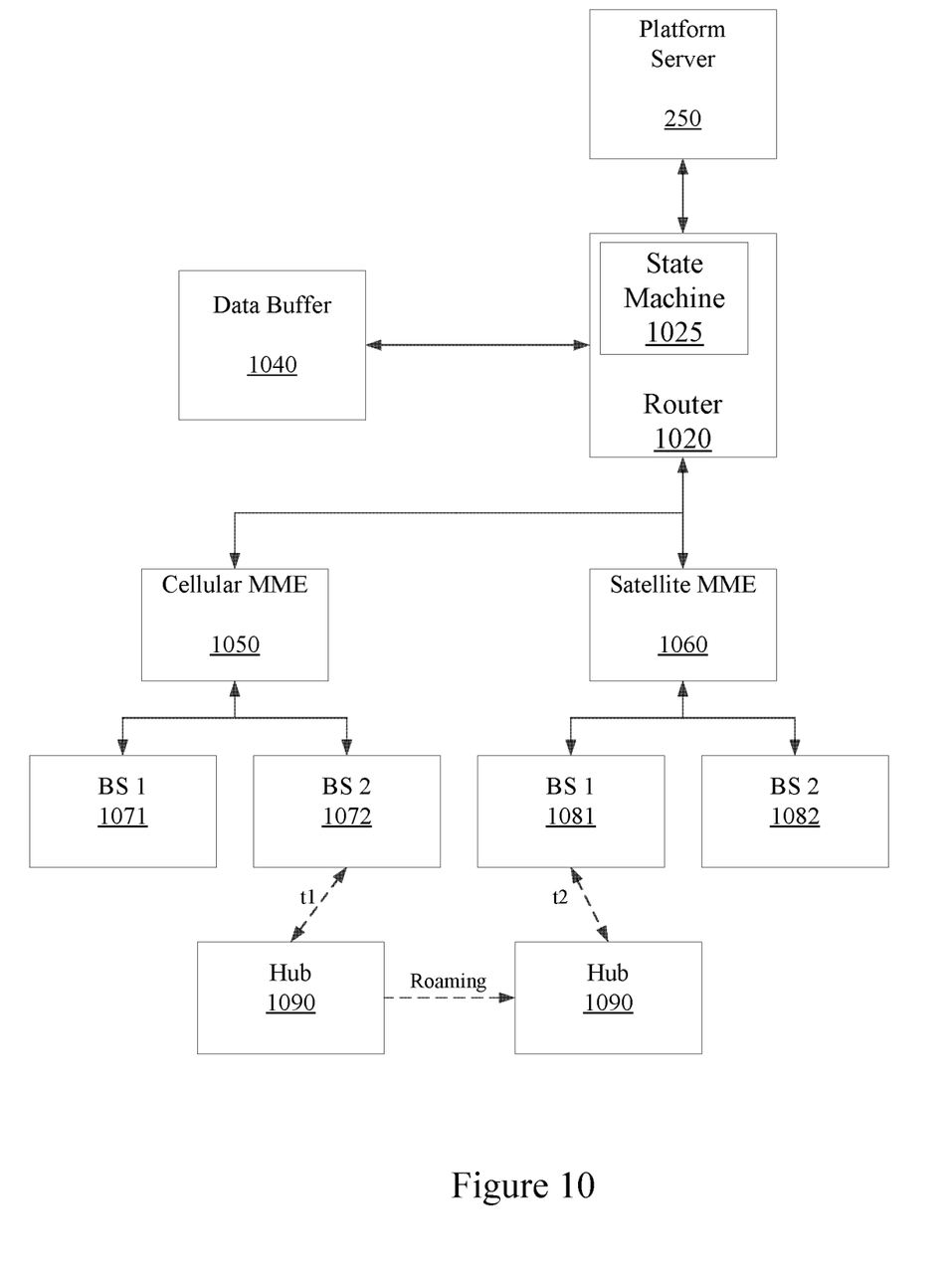
FIG. 10 shows a wireless communication system for connecting a wireless hub across multiple wireless networks, according to another embodiment.

FIG. 10 shows a wireless communication system for connecting a wireless hub across multiple wireless networks, according to another embodiment. FIG. 10 additionally shows base stations 1071, 1072 of a cellular MME (mobility management entity) network 1050, and base stations 1081, 1082 of a satellite MME network 1060. The base stations 1071, 1072, 1081, 1082 facilitate the wireless connections with the hub 1090. The described embodiments for wireless hub across multiple wireless networks facilitate roaming of the wireless hub 1090 from, for example, the cellular MME network 1050 to the satellite MME network 1060. The data buffer 1040 may be utilized to prevent packet losses when the hub 1090 roams from the cellular MME 1050 to the satellite MME 1060. The propagation delays t1, t2 between the base station 1072 of cellular MME network 1050 to the base station 1081 of the satellite MME network 1060 can be substantial.

FIG. 10 additionally shows the state machine 1025 included within the router 1020. For an embodiment, the router 1020 may connect to a serving gateway for a service capabilities exposure function.

Figure 11:
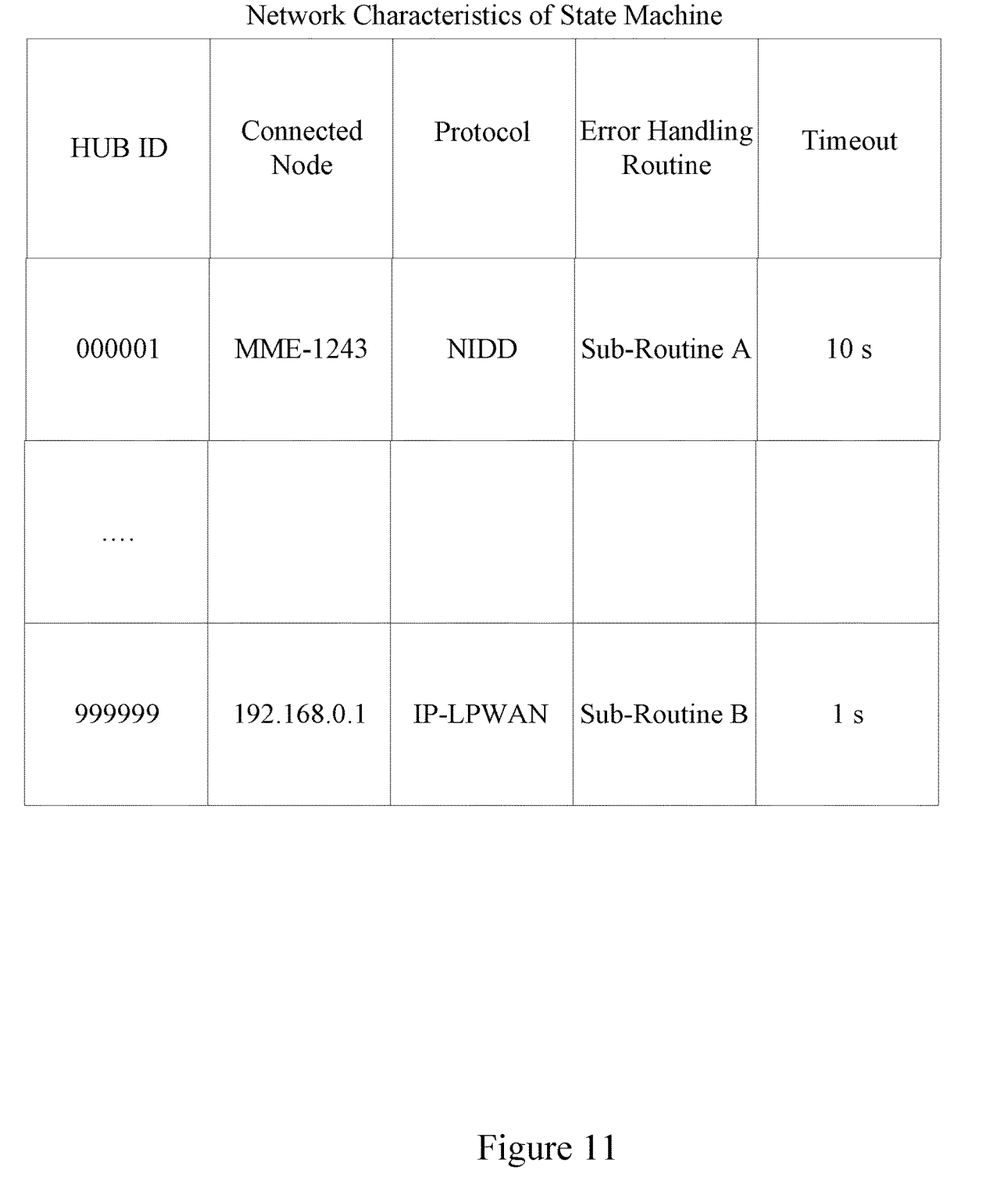
FIG. 11 is a table that illustrates examples of network characteristics of a state machine, according to an embodiment.

FIG. 11 is a table that illustrates examples of network characteristics of a state machine, according to an embodiment.

Although specific embodiments have been described and illustrated, the embodiments are not to be limited to the specific forms or arrangements of parts so described and illustrated. The described embodiments are to only be limited by the claims.

What is claimed:

1. A wireless communication system, comprising: a state machine that operates to maintain a network availability of each of a plurality of wireless networks for a wireless device, wherein each of the plurality of wireless networks include network characteristics, wherein the network characteristics include at least a connection status; a router, the router operative to: select a one of the plurality of wireless networks based on the network availability and the network characteristics as maintained by the state machine; wherein the wireless device is one of a plurality of wireless devices of the wireless communication system, and the wireless device is operative to: receive a network selection rulebook from the router, wherein the network selection rulebook provides data packet processing and available network routing rules, wherein the network selection rulebook is generated based upon the network availability and network characteristics; and select a one of the plurality of upstream wireless networks based on the network selection rulebook to transmit data packets to the router based on the network selection rulebook; and wherein the network selection rulebook received by the wireless device is unique from a network selection rulebook received by at least one other wireless device of the plurality of wireless devices.

2. The wireless communication system of claim 1, wherein the network characteristics further include at least IP and non-IP protocols including retry and acknowledgment characteristics, satellite and non-satellite communication channels.

3. The wireless communication system of claim 2, wherein IP and non-IP network characteristics include at least a communication protocol.

4. The wireless communication system of claim 1, wherein the router is further operative to process data packets according to the selected available wireless network based on the network characteristics of the selected available wireless network.

5. The wireless communication system of claim 1, wherein the router is further operative to route the processed data packets to the wireless device through the selected one of the plurality of wireless networks.

6. The wireless communication system of claim 1, wherein for at least one of the plurality of wireless devices, downstream (forward) data traffic is through one wireless network and upstream (return) data traffic is through another wireless network.

7. The wireless communication system of claim 1, wherein the wireless device is operative to: ruleset synchronizes with the state machine through the wireless device's use of the network selection rulebook by the wireless device which the wireless device received based on at least the network characteristics of the state machine.

8. The wireless communication system of claim 1, wherein the wireless device further operates to select the one of the plurality of upstream wireless networks to transmit data packets to the router based on-a local operating state of the wireless device, where the local operating state of the wireless device includes a set of local conditions of the wireless device.

9. The wireless communication system of claim 1, wherein the wireless device is operative to: provide an update to the router and state machine of network availability and connection status.

10. The wireless communication system of claim 1, wherein processing the data packets comprises packet packaging, protocol adaptation, and packet acknowledgement and retry mechanism based upon the network characteristics of the selected network.

11. The wireless communication system of claim 1, wherein satellite and non-satellite network characteristics include at least a communication latency.

12. The wireless communication system of claim 1, wherein the state machine additionally operates to maintain statuses of connection types of data sources connected to the wireless device, and wherein processing of the data packets is further based on the statuses of connection types of the data sources.

13. The wireless communication system of claim 1, wherein the state machine additionally operates to maintain statuses of connection types of data sources connected to the wireless device, and wherein the selection of the one of the plurality of wireless networks is additionally based on the statuses of connection types of the data sources.

14. The wireless communication system of claim 1, further comprising: a data buffer, the data buffer operative to queue pre-processed data packets, wherein each data packet of the data buffer remains in the data buffer until the router successfully transmits the data packet based upon the network characteristics of the selected network.

15. The system of claim 14, wherein upon an update to the state machine, the data router retrieves previously unsuccessfully transmitted data packets from the data buffer and reprocesses the retrieved unsuccessfully transmitted data packets based upon the network characteristics of a more currently selected network.

16. The system of claim 1, wherein the wireless device operates to maintain multiple connections to a server platform through multiple of the plurality of available networks, and wirelessly communicates with at least one of the plurality of available networks in accordance with the network selection rulebook.

17. The system of claim 1, wherein a platform server pushes updates to the network selection rulebook based on at least a use case, geography, or network traffic.

18. A method of connecting a wireless device across multiple networks of a wireless communication system, comprising: maintaining, by a state machine, a network availability of each of a plurality of wireless networks for a wireless device, wherein each of the plurality of wireless networks include network characteristics, wherein the network characteristics include at least a connection status; receiving, by the wireless device, a network selection rulebook from the router, wherein the network selection rulebook provides data packet processing and available network routing rules, wherein the network selection rulebook is generated based upon the network availability and network characteristics, wherein the wireless device is one of a plurality of wireless devices of the wireless communication system; and selecting, by the wireless device, a one of the plurality of upstream wireless networks based on the network selection rulebook to transmit data packets to the router based on the network selection rulebook, and wherein the network selection rulebook received by the wireless device is unique from a network selection rulebook received by at least one other wireless device of the plurality of wireless devices.

* * * * *